Aug. 30, 1938.  C. H. GEMBERLING  2,128,224
PLOW
Filed July 27, 1936    3 Sheets-Sheet 1
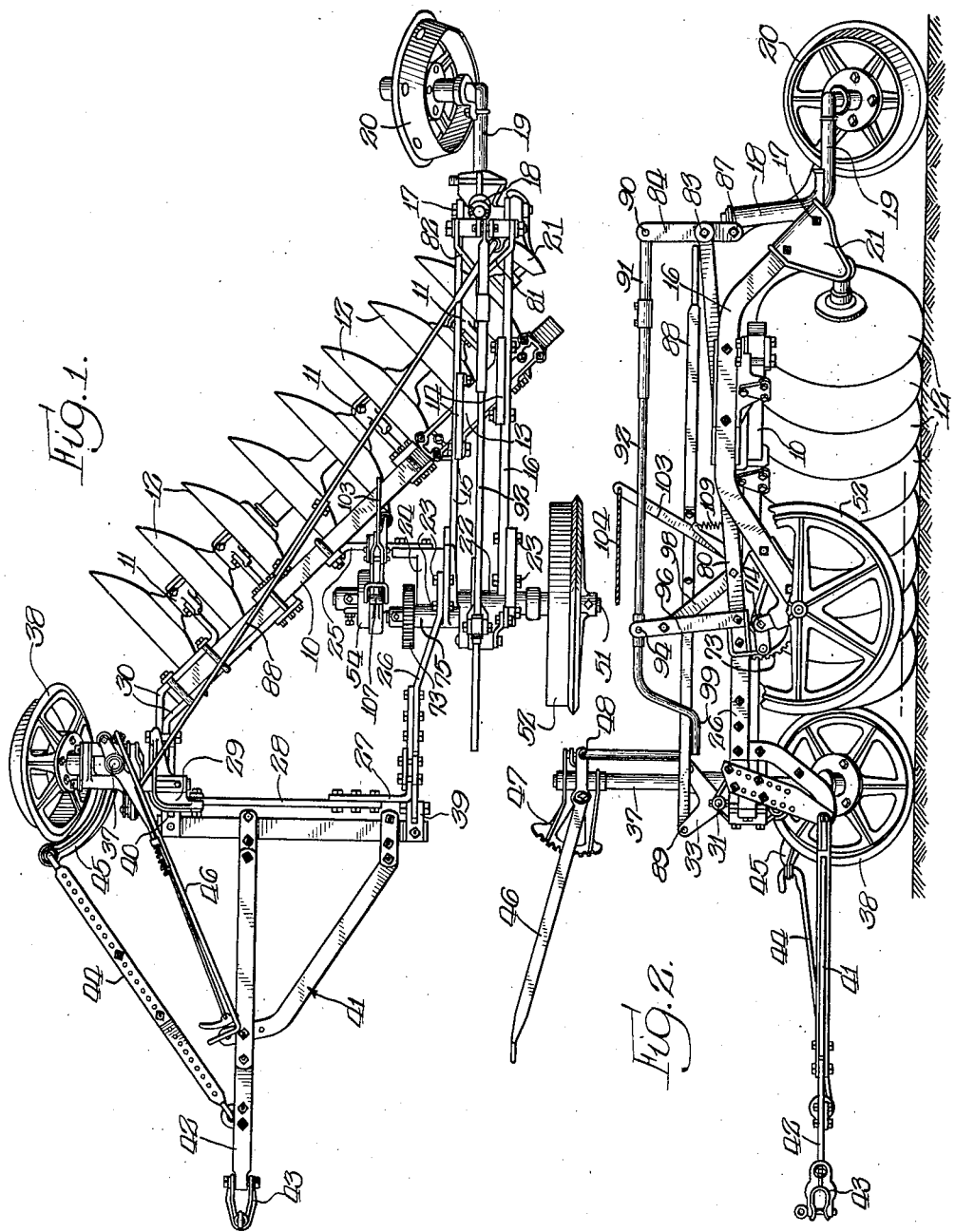
Inventor:—
Cameron H. Gemberling,
By John P. Smith, Atty.

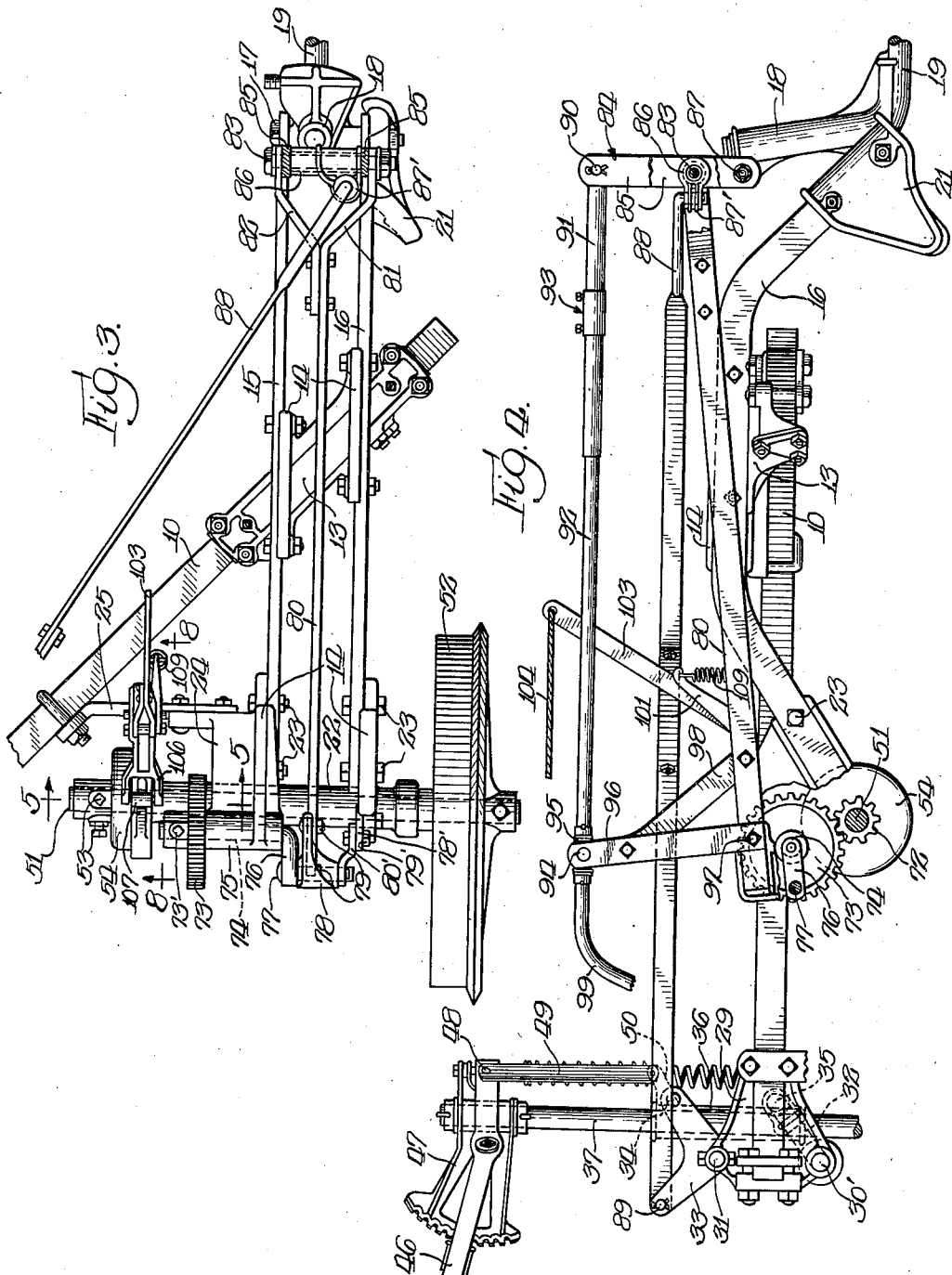

Aug. 30, 1938.   C. H. GEMBERLING   2,128,224
PLOW
Filed July 27, 1936   3 Sheets-Sheet 3
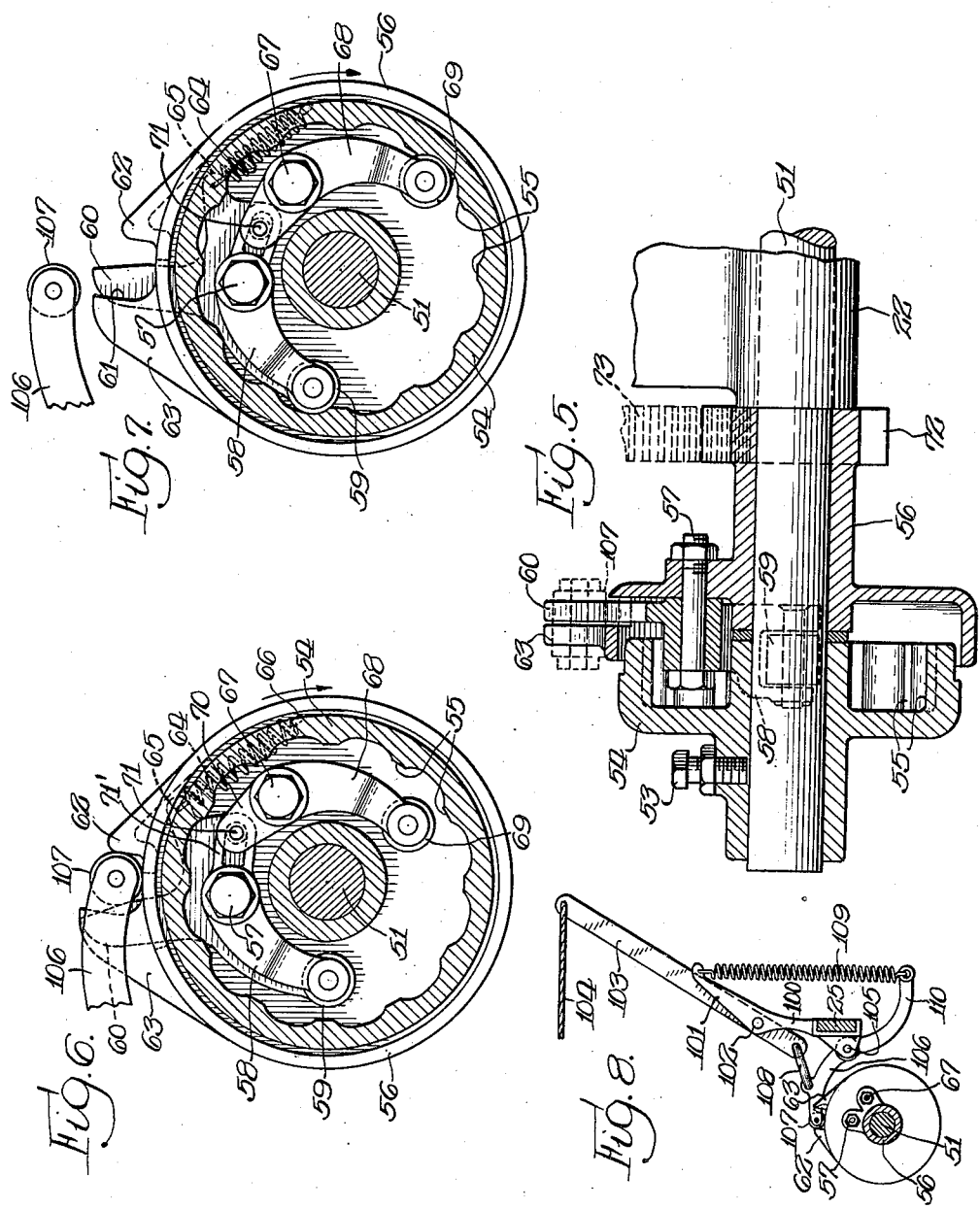
Inventor:-
Cameron H. Gemberling
By John P. Smith   Atty.

Patented Aug. 30, 1938

2,128,224

UNITED STATES PATENT OFFICE 2,128,224

PLOW

Cameron H. Gemberling, South Bend, Ind., assignor to Oliver Farm Equipment Company, a corporation of Delaware Application July 27, 1936, Serial No. 92,708

17 Claims. (Cl. 97—72)

The present invention relates generally to plows, but more particularly to a power lift mechanism and its associated parts for raising and lowering the earth working elements of the plow structure.

In power lift mechanisms heretofore constructed and used in the conventional plow, it has been common to permit the earth working elements to drop by gravity to ground engaging position and this arrangement is satisfactory for the lighter type of moulboard or disc plow, but when it is employed in connection with a oneway or other heavy type of plows, it becomes very unsatisfactory. This arrangement of permitting the weight or gravity to lower the earth working elements of a heavy type plow, such as a oneway plow, frequently renders the power lift mechanism ineffective to lower the plow because in many instances where such type of plow is used for very shallow plowing in soft soil which offers practically no resistance to the earth working element, the sudden dropping of the tools to earth working position occurs so rapidly upon the actuation of the trip lever by the operator he cannot release his grip quickly enough, with the result that instead of the plow being lowered to normal plowing or operative position, the lifting or clutch mechanism immediately retains its engagement and again raises the earth working elements against the wishes of the operator.

It is therefore the primary object of the present invention to overcome these objectionable features and provide means controlled by the power lift clutch so that the earth working elements are gradually lowered to their working position in accordance with the forward motion of the plow.

Another object of the invention is to provide a novel and improved power lift clutch mechanism for a plow which controls and positively drives the operative parts thereof for lowering the earth working elements.

A still further object of the invention is to provide a novel and improved power lift mechanism for a plow in which novel operative connections are provided between the front and rear furrow wheels for the purpose of raising and lowering the plow structure with respect to its supporting wheels.

Another object of the invention is to provide a novel and improved power lift mechanism in which the land wheel is rigidly secured to one end of a straight axle journaled in the frame. Secured to the other end of the axle is a clutch mechanism. The crank and gears which are operatively associated with the clutch mechanism are located between the land wheel and the clutch mechanism.

These and other objects are accomplished by providing a construction and an arrangement of the various parts in the manner hereinafter described and particularly pointed out in the appended claims.

Referring to the drawings:

Fig. 1 is a top plan view of a conventional type of one-way plow having my improved power lift mechanism embodied therein;

Fig. 2 is a side elevational view of the same;

Fig. 3 is an enlarged fragmentary top plan view of the power lift mechanism and its associated parts with certain parts removed therefrom for the purpose of clearness;

Fig. 4 is a fragmentary view partly in cross section showing the operative parts in Fig. 3;

Fig. 5 is an enlarged cross sectional view taken on the line 5—5 in Fig. 3;

Fig. 6 is an enlarged cross sectional view showing the pawls of the intermittently driven clutch member disengaged from the continuously driven clutch member;

Fig. 7 is a similarly cross sectional view showing the pawls engaging the continuously driven clutch member; and Fig. 8 is a fragmentary cross-sectional view taken on the line 8—8 in Fig. 3.

In illustrating one form of my invention I have shown the same in connection with the conventional type of one-way plow which comprises a main frame including a diagonally disposed plow beam 10 to which is attached spaced apart bearing brackets 11 in which is journaled the usual shaft carrying the spaced apart discs 12. Secured adjacent the rear end of the beams 10 is a main frame bracket 13 which is provided with two longitudinally and upwardly extending spaced apart flanges 14 to which are rigidly secured the intermediate portions of longitudinally extending supplemental main frame members 15 and 16. These supplemental frame members 15 and 16 are arched and have pivotally secured between their rear ends by means of a bolt 17 a rear furrow wheel axle bracket 18. Oscillatably mounted in the bracket 18 is a substantially right angularly bent axle 19 on the rear end of which is journaled a rear furrow wheel 20. Secured to the rear end of the outside supplemental frame member 16 is a thrust bearing plate 21 against which the shaft of the discs bear. Secured to the forward ends of the supplemental main frame members 15 and 16 by means of bolts 23 is a land wheel axle housing or bearing 22. Formed integrally with the bearing or housing 22 is a rearwardly extending portion 24 which is connected by means of a bar 25 to the diagonal plow beam 10 as clearly shown in Fig. 1 of the drawings. Connected adjacent the forward end of the supplemental frame member 15 by means of the bolts 23 is a forwardly projecting main frame member 26 which in turn is connected at its forward end to a right angularly bent frame bar 27 to a transverse frame member 28. The other end of the transverse member 28 is connected by means of corner bracket 29 and straps 30 to the forward end of the beam 10. Pivotally mounted on vertically spaced apart pivots as shown at 30' and 31 on the bracket 29 is a parallel link lifting mechanism for the front furrow wheel which includes a link 32 and a link in the form of a bell-crank 33. The rear ends of these parallel links 32 and 33 are pivotally connected as shown at 34 and 35 respectively to rearwardly extending ears of a vertically extending sleeve 36 which slidably and pivotally receive the vertically extending shank 37 of the front furrow wheel axle. Journaled on the substantially right angularly bent portion of the axle 37 is a front furrow wheel 38. Pivotally connected by means of hinge connections as shown at 39 and 40 is a draft frame generally indicated at 41 which may be adjusted laterally with respect to the main frame in a manner well understood in the art. This draft frame comprises a forwardly extending tongue 42 to the forward ends of which is pivoted a draft clevis 43 for connection to a tractor. Connected to one side of the draft member 42 is an adjustable supplemental draft connection 44 which has its rear end connected to a crank 45 attached to the lower end of the land wheel axle 37. The sleeve 36 may be vertically adjusted on the axle shank 37 by manually operable lever 46 pivoted to a sector bracket 47 attached to the upper end of the axle shank 37. The rear end of the lever is pivotally connected as shown at 48 by means of links 49 to an ear 50 formed on the upper end of the sleeve 36 for vertically adjusting the depth penetration of the discs on the forward end of the plow structure.

My improved power lift mechanism comprises a land wheel axle shaft 51 which is journaled in the housing or bearing bracket 22 of the main frame. Rigidly secured to the outer end of the shaft 51 is a land wheel 52. Secured to the inner end of the axle 51 by means of a set screw 53 is a continuously driven clutch member 54. The inner surface of the flange of the continuously driven clutch member 54 is provided with the conventional form of clutch teeth 55. Mounted between the clutch member 54 and the bearing 22 and journaled on the shaft 51 is an intermittently driven clutch member generally indicated by the reference character 56. Pivotally secured to the inner face of the intermittently driven clutch member 56 by means of a bolt 57 is a pivoted lifting pawl 58. To one end of the pawl is journaled a roller 59 which is adapted to engage the recesses between the clutch teeth 55 of the continuously driven clutch member 54. Formed integrally with the pawl 58 and projecting outwardly through a recess in the flange of the clutch member 56 is a latch 60 which is adapted to swing into the path or recess 61 formed between two oppositely disposed lugs 62 and 63, which in turn, are formed integrally with the intermittently driven clutch member 56. The roller 59 is normally actuated into engagement with the clutch teeth of the intermittently driven clutch member 54 and the latch normally actuated into the path of the recess 61 by an extension spring 64 which has one end thereof connected to an ear 65 formed integrally with the pawl 58 on that side of the pivot of the pawl opposite the roller 59. The other end of the spring 64 is connected as shown at 66 to the inner surface of a flange of the intermittently driven clutch member 56. Pivotally mounted to the inner surface of the flange of the intermittently driven clutch member 56 by means of a bolt 67 is a second or lowering pawl 68 which has journaled on one end thereof a roller 69 which in turn is adapted to engage the recesses between the clutch teeth 55 of the continuously driven clutch member 54 as clearly shown in Figs. 6 and 7 of the drawings. Formed integrally with the lowering pawl 68 and projecting substantially in a direction opposite to that of the arm which supports the roller 69 is an ear 70, which in turn, is slidably connected by a pin 71 to a radially disposed slotted arm 71' which is formed integrally with the pawl 58. Obviously from the above description it will be understood that these cooperating pawls are simultaneously actuated to clutch engaging position by the action of the spring and are simultaneously disengaged from clutch engaging position by the actuation of the latch 60 as clearly shown in Figs. 6 and 7 of the drawings. Formed integrally with the intermittently driven clutch member 56 is a pinion 72 which is adapted to engage in meshing relation with and operatively drive a gear 73 of twice the diameter of the pinion. The gear 73 is secured to a crank shaft 74 by means of a set screw 73'. The shaft 74 is journaled in a bearing barrel 75 formed integrally with the housing 22. Formed integrally with and on the outer end of the shaft 74 is a crank 76. Journaled on the free end of the crank 76 by means of a pin 77 is a bracket 78 to which is connected by means of bolts 79 a pitman bar 80. A supplemental crank or link 80' has one end pivoted to the pin 77 and the other end pivoted by means of a bolt 79' to an ear 78' formed integrally with the bearing 22. This link 80' forms a bearing support for one end of the crank pins 77. The rear end of the pitman bar is offset as shown at 81 and has secured adjacent its rear end an offset trap 82 between the rear ends of which is journaled, by means of a bolt 83, a lever bracket generally indicated by the reference character 84. This lever bracket 84 comprises two flat straps 85 which have their intermediate portions spaced apart and held in spaced relation from each other by sleeves 86. The lower ends of these straps converge and are pivotally connected by means of a bolt as shown at 87 to the upper end of the rear furrow wheel bracket 18. Formed integrally with the sleeve 86 on the forward side thereof are apertured spaced apart ears 87' in which is pivotally connected the rearward end of a connecting rod 88. The forward end of this connecting rod 88 is pivotally connected as shown at 89 to the forwardly projecting arm of the bell-crank 33 which forms part of the parallel link lifting mechanism for the front furrow wheel. The upper ends of the straps 85 of the lever 84 converge towards one another and are pivotally connected by means of a pin 90 to the rearward end 91 of an adjustable crank rod 92. The rods 91 and 92 are connected by an adjustable ball-bearing screw mechanism generally indicated by the reference character 93 of well known construction for adjusting their relative position longitudinally with respect to each other. The forward end of the rod 92 is pivotally connected as shown at 94 by a swivel bearing connection 95 of well known construction to the upper ends of two vertically disposed straps 96 which in turn have their lower ends rigidly secured by means of bolts 97 adjacent the forward end of the pitman bar 80. These straps 96 are reinforced by a brace bar 98 in the manner clearly disclosed in Fig. 4 of the drawings. The forward end of the rod 92 is provided with a crank handle 99 for manually adjusting the relative position of the lever 84 for controlling the depth penetration of the plow by regulating the position of the rear furrow wheel with respect to the plow structure. Secured to the frame member 25 adjacent the clutch mechanism is a bracket 100 which has an upwardly and rearwardly extending arm 101 formed integrally therewith. (See Fig. 8.) Pivotally connected to the bracket 100 by a pin 102 is an upwardly extending trip lever 103 to the upper free end of which is connected a rope or cable 104 which extends to the operator's seat on the tractor. Pivotally connected to ears 105 formed integrally with the bracket 100 is a trip member 106 which has journaled in its forward bifurcated end a roller 107. This roller 107 is adapted to be moved into and out of the path of the intermittently driven clutch member 56 for engaging the latch 60. This roller 107 upon an engagement with the latch 60 disengages the rollers 59 and 69 of the pawls 58 and 68 respectively from engagement with the clutch teeth 55 of the continuously driven clutch member 54. The trip member 106 is pivotally connected by a link 108 to the lower end of the trip lever 103. The trip lever 106 is normally pressed into engagement with the intermittently driven clutch member 56 by a spring 109 which has its lower end connected to the rearwardly extending arm 110 of the trip member 106 while the upper end of the spring 109 is connected to the arm 101 of the bracket 100. (See Fig. 8.)

The operation of my improved power lift mechanism is as follows:

Let us assume that the earth working elements or the discs are in their elevated position and that the operator is desirous of lowering these discs from their inoperative elevated position to their lowered operative ground engaging position, or to the position shown in Fig. 2 of the drawings. Upon the actuation of the cord 104 from the tractor seat, the lever 103 is swung forwardly disengaging the trip 106 and roller 107 from the latch 60, releasing the pawls 58 and 68 so that the rollers 59 and 69 engage the teeth or recesses between the teeth 55 of the continuously rotating clutch member 54. In this connection it will be observed that the roller 69 of the lowering pawl 68 will engage the clutch teeth in the manner shown in Fig. 7 of the drawings and will permit the lowering of the earth working elements or discs only at the speed of travel of the continuously driven clutch member as the same travels in a direction indicated by the arrow in Fig. 7 of the drawings. Inasmuch as there is two to one gearing relationship between the gears 72 and 76, it will require one complete revolution of the land wheel 52 to revolve the intermittently driven clutch member. Upon the actuation of the crank 76, a half revolution from the position opposite to that shown in Figs. 3 and 4, the upper end of the axle bracket 18 will swing forwardly to lower the frame structure and earth working elements with respect to the rear furrow wheel. Simultaneously with the forward movement of the lever 84 the connection 88 moves forwardly actuating the bell-crank 33 to lower the front end of the plow structure. When the earth working elements are in their operative or ground engaging position as shown in Fig. 2 of the drawings, upon an actuation of the trip cord 104 and a complete revolution of the land wheel 52 by the forward motion of the plow, the crank 76 will again revolve a half-revolution to raise the plow. Should the operator be desirous of regulating the depth penetration of the disc carried by the rear end of the plow, the connection 92 may be lengthened or shortened by turning the crank 99 to adjust relatively the rear furrow wheel bracket 18 with respect to the plow structure. Should the operator be desirous of adjusting the depth penetration of the earth working elements on the front end of the plow, the front furrow wheel may be adjusted by manually adjusting the lever 46 with respect to its complementary lever sector 47, thereby adjusting the sleeve 36 and the frame structure of the plow with respect to the shank 37 of the front furrow wheel.

From the above description it will be readily seen that I have provided a simple and efficient power lift mechanism and one which will respond to the will of the operator in that it will permit the lowering of the earth working elements by engaging the clutch members during the lowering operation of the plow into the ground, instead of depending upon the weight or gravity of the plow structure for accomplishing this function as is now done by plows of this type heretofore constructed. In this connection it will also be noted that a more efficient and positively operated power lift mechanism is secured by rigidly fixing the land wheel to the land wheel axle with the clutch mechanism at the inner end of the land wheel axle. By providing the bearing for supporting the axle at an intermediate part thereof, a more efficient and easily operated power lift mechanism is afforded.

While in the above specification I have described one embodiment my invention may assume in practice, it will of course be understood that the same is capable of modification and that modification may be made without departing from the spirit and scope of the invention as expressed in the following claims:

What I claim is my invention and desire to secure by Letters Patent is:

1. A plow comprising a frame, earth working elements carried by said frame, a front furrow wheel supporting the front end of said frame, a rear furrow wheel supporting the rear end of said frame, an axle journaled in said frame, a land wheel secured to the outer end of said axle, a power lift means including a clutch mechanism carried by the inner end of said axle, a pinion adapted to be intermittently driven by said clutch mechanism, a crank shaft journaled on said frame, a gear secured to said crank shaft and meshing with said pinion, a connection between said crank shaft and said rear furrow wheel including a lever operatively related to said rear furrow wheel, a second connection pivoted at one end to an intermediate portion of said lever and connected at its other end to said front furrow wheel for raising and lowering said frame with respect to the ground, and means associated with the clutch mechanism for gradually lowering said frame in accordance with the forward motion of said plow.

2. A plow comprising a frame, supporting wheels for said frame an oscillatable bearing bracket mounted on said frame in which one of said wheels is mounted, earth working elements carried by said frame, a power lift mechanism including a shaft journaled in said frame, one of said wheels secured to the outer end of said shaft, a clutch mechanism secured to the other end of said shaft, a supplemental shaft journaled in said frame and adapted to be intermittently driven by said clutch mechanism, operative connections including a lever pivoted on said bearing bracket and operatively connected to said supplemental shaft, and means for operatively connecting the remaining wheel with said lever for raising and lowering said frame with respect to the ground.

3. A plow comprising a frame, supporting wheels for said frame a bearing bracket pivoted to said frame, one of said wheels carried by said bracket, earth working elements carried by said frame, a power lift mechanism including a shaft journaled in said frame, a second of said wheels secured to the outer end of said shaft, a clutch mechanism secured to the other end of said shaft, a supplemental shaft journaled in said frame and adapted to be intermittently driven by said clutch mechanism, a lever pivoted at one end to said bearing bracket and operatively connected to said supplemental shaft, means for connecting said lever to the remaining wheel for raising and lowering said frame with respect to the ground, and means associated with said clutch mechanism for gradually lowering said frame in accordance with the forward motion of said plow.

4. A plow comprising a frame, supporting wheels for said frame a bearing bracket pivoted to said frame, one of said wheels carried by said bracket, earth working elements carried by said frame, a power lift mechanism including a shaft journaled in said frame, a second of said wheels secured to the outer end of said shaft, a clutch mechanism secured to the other end of said shaft, a supplemental shaft journaled in said frame and adapted to be intermittently driven by said clutch mechanism, a lever pivoted at one end to said bearing bracket and operatively connected to said supplemental shaft, means for connecting said lever to the remaining wheel for raising and lowering said frame with respect to the ground, and separate manually controlled means associated with certain of said wheels for adjusting the same with respect to said frame for regulating the depth penetration of said earth working elements.

5. A plow comprising a frame, earth working elements carried by said frame, a furrow wheel supporting one end of said frame, a second furrow wheel supporting the other end of said frame, a land wheel journaled in said frame, a power lift mechanism mounted on said frame and operatively driven by said land wheel, a lever pivotally related to one of said furrow wheels, a link connection between said lever and said power lift mechanism, and a manually adjustable connection carried by said link and connected to said lever for adjusting the depth penetration of the earth working elements adjacent said last named furrow wheel.

6. A plow comprising a frame, earth working elements carried by said frame, a furrow wheel supporting one end of said frame, a second furrow wheel supporting the other end of said frame, a land wheel journaled in said frame, a power lift mechanism mounted on said frame and operatively driven by said land wheel, a lever pivotally related to one of said furrow wheels, a link connection between said lever and said power lift mechanism, a manually adjustable connection carried by said link and connected to said lever for adjusting the depth penetration of the earth working elements adjacent said last named furrow wheel, and a second link connecting said lever with said second named furrow wheel whereby upon the actuation of said power lift mechanism said furrow wheels are actuated to raise or lower said frame.

7. A plow comprising a frame, earth working elements carried by said frame, a front furrow wheel supporting the front end of said frame, a rear furrow wheel supporting the rear end of said frame, a land wheel journaled in said frame, a power lift mechanism mounted on said frame and operatively driven by said land wheel, a lever having its lower end pivotally related to said rear furrow wheel, a connection having one end pivotally connected to an intermediate portion of said lever and its other end operatively related to said power lift mechanism, a manually adjustable connection having one end relatively fixed to and supported by said first named connection and its other end pivotally connected to the upper end of said lever, and a third connection having one end connected to an intermediate portion of said lever and the other end operatively related to said front furrow wheel.

8. A plow comprising a frame, earth working elements carried by said frame, a front furrow wheel supporting the front end of said frame, a rear furrow wheel supporting the rear end of said frame, a land wheel journaled in said frame, a power lift mechanism mounted on said frame and operatively driven by said land wheel, a lever having its lower end pivotally related to said rear furrow wheel, a connection having one end pivotally connected to an intermediate portion of said lever and its other end operatively related to said power lift mechanism, a manually adjustable connection having one end relatively fixed to and supported by said first named connection and its other end pivotally connected to the upper end of said lever, a third connection having one end connected to an intermediate portion of said lever and the other end operatively related to said front furrow wheel, and manually controlled means operatively associated with said front furrow wheel for adjusting the depth penetration of the earth working elements on the front end of said frame.

9. A plow comprising a frame, earth working elements carried by said frame, a furrow wheel supporting one end of said frame, a second furrow wheel supporting the other end of said frame, a land wheel journaled in said frame, a power lift mechanism mounted on said frame and operatively driven by said land wheel, a lever pivotally related to one of said furrow wheels, a link connection between said lever and said power lift mechanism, a manually adjustable connection carried by said link and connected to said lever for adjusting the depth penetration of the earth working elements adjacent said last named furrow wheel, and means associated with said power lift mechanism for gradually lowering said earth working elements into engagement with the ground.

10. A plow comprising a frame, earth working elements carried by said frame, a furrow wheel supporting one end of said frame, a second furrow wheel supporting the other end of said frame, a land wheel journaled in said frame, a power lift mechanism mounted on said frame and operatively driven by said land wheel, a lever pivotally related to one of said furrow wheels, a link connection between said lever and said power lift mechanism, a manually adjustable connection carried by said link and connected to said lever for adjusting the depth penetration of the earth working elements adjacent said last named furrow wheel, a second link connecting said lever with said second named furrow wheel whereby upon the actuation of said power lift mechanism said furrow wheels are actuated to raise or lower said frame, and means associated with said power lift mechanism for gradually lowering said earth working elements into engagement with the ground.

11. A plow comprising a frame, earth working elements carried by said frame, a front furrow wheel supporting the front end of said frame, a rear furrow wheel supporting the rear end of said frame, a land wheel journaled in said frame, a power lift mechanism mounted on said frame and operatively driven by said land wheel, a lever having its lower end pivotally related to said rear furrow wheel, a connection having one end pivotally connected to an intermediate portion of said lever and its other end operatively related to said power lift mechanism, a manually adjustable connection having one end relatively fixed to and supported by said first named connection and its other end pivotally connected to the upper end of said lever, a third connection having one end connected to an intermediate portion of said lever and the other end operatively related to said front furrow wheel, and means associated with said power lift mechanism for gradually lowering said earth working elements into engagement with the ground.

12. A plow comprising a frame, earth working elements carried by said frame, a front furrow wheel supporting the front end of said frame, a rear furrow wheel supporting the rear end of said frame, a land wheel journaled on said frame, a power lift mechanism mounted on said frame and operatively driven by said land wheel, a lever having its lower end pivotally related to said rear furrow wheel, a connection having one end pivotally connected to an intermediate portion of said lever and its other end operatively related to said power lift mechanism, a manually adjustable connection having one end relatively fixed to and supported by said first named connection and its other end pivotally connected to the upper end of said lever, a third connection having one end connected to an intermediate portion of said lever and the other end operatively related to said front furrow wheel, manually controlled means operatively associated with said front furrow wheel for adjusting the depth penetration of the earth working elements on the front end of said frame, and means associated with said power lift mechanism for gradually lowering said earth working elements into engagement with the ground.

13. A plow comprising a frame, earth working elements carried by said frame, a furrow wheel supporting one end of said frame, a second furrow wheel supporting the other end of said frame, a land wheel journaled in said frame, a power lift mechanism mounted on said frame and operatively driven by said land wheel, a lever pivotally related to one of said furrow wheels, means for connecting said lever with said power lift mechanism, and means carried by said last named means and operatively connected to said lever for adjusting the depth penetration of said earth working elements.

14. A plow comprising a frame, earth working elements mounted on said frame, a furrow wheel supporting one end of said frame, a second furrow wheel supporting the other end of said frame, a land wheel journaled on said frame, a power lift mechanism mounted on said frame and operatively driven by said land wheel, a lever pivotally related to one of said furrow wheels, means for connecting said lever with said power lift mechanism, and manually operable means carried by said last named means and operatively connected to said lever for adjusting the depth penetration of said earth working elements.

15. A plow comprising a frame, earth working elements carried by said frame, a furrow wheel supporting one end of said frame, a second furrow wheel supporting the other end of said frame, a land wheel journaled on said frame, a power lift mechanism mounted on said frame and operatively driven by said land wheel, a lever pivotally related to one of said furrow wheels, means for connecting said lever with said power lift mechanism, means carried by said last named means and operatively connected to said lever for adjusting the depth penetration of the earth working elements, and a link connecting said lever with said second named furrow wheel, whereby upon the actuation of said power lift mechanism said furrow wheels are actuated to raise and lower said frame.

16. A plow comprising a frame, earth working elements carried by said frame, a furrow wheel supporting one end of said frame, a second furrow wheel supporting the other end of said frame, a land wheel journaled in said frame, a power lift mechanism mounted on said frame and operatively driven by said land wheel, a lever pivotally related to one of said furrow wheels, means for connecting said lever with said power lift mechanism, means carried by said last named means and operatively connected to said lever for adjusting the depth penetration of the earth working elements, and a connection having one end connected to an intermediate portion of said lever and the other end operatively related to said front furrow wheel.

17. A plow comprising a frame, earth working elements carried by said frame, a front furrow wheel supporting the front end of said frame, a rear furrow wheel supporting the rear end of said frame, an axle journaled in said frame, a land wheel secured to the other end of said axle, a power lift means including a clutch mechanism carried by the inner end of said axle, a pinion adapted to be intermittently driven by said clutch mechanism, a crank shaft journaled on said frame, a gear secured to said crank shaft and meshing with said pinion, a connection between said crank shaft and said rear furrow wheel including a lever pivotally related to said furrow wheel, and a second connection having one end operatively connected to the intermediate portion of said lever and the other end operatively connected to said front furrow wheel for raising and lowering said frame with respect to the ground.

CAMERON H. GEMBERLING.